July 18, 1933.                G. J. DASHEFSKY                    1,918,249
                  DEVICE FOR ELIMINATING TORSIONAL VIBRATION
                          Filed Nov. 22, 1927        3 Sheets-Sheet 2
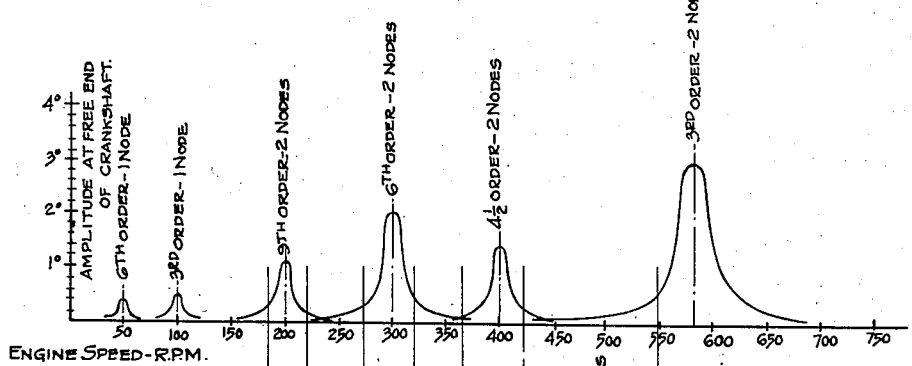
FIGURE No. 4
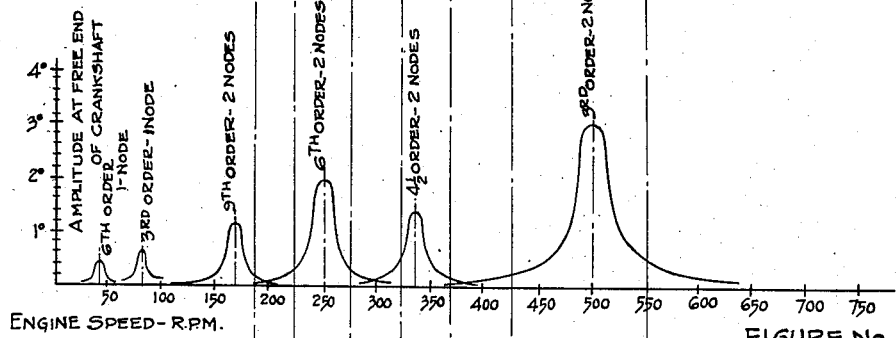
FIGURE No. 5
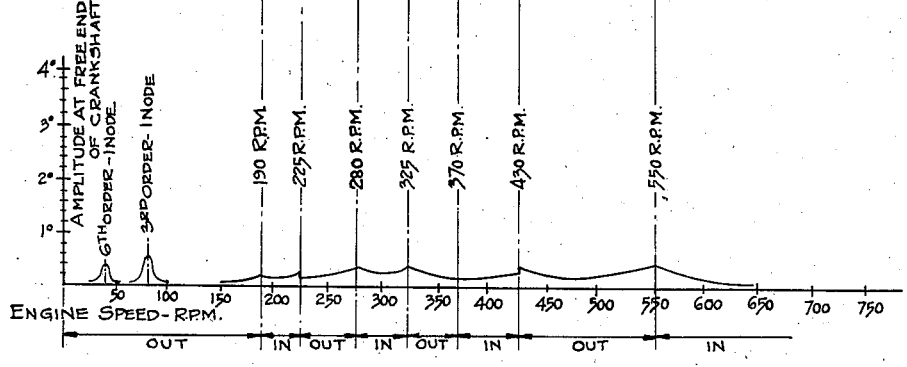
FIGURE No. 6
WITNESSES:
 Frederic P. Porter
 John Dietmeier.
George Joseph Dashefsky
INVENTOR July 18, 1933. G. J. DASHEFSKY 1,918,249
DEVICE FOR ELIMINATING TORSIONAL VIBRATION
Filed Nov. 22, 1927 3 Sheets-Sheet 3
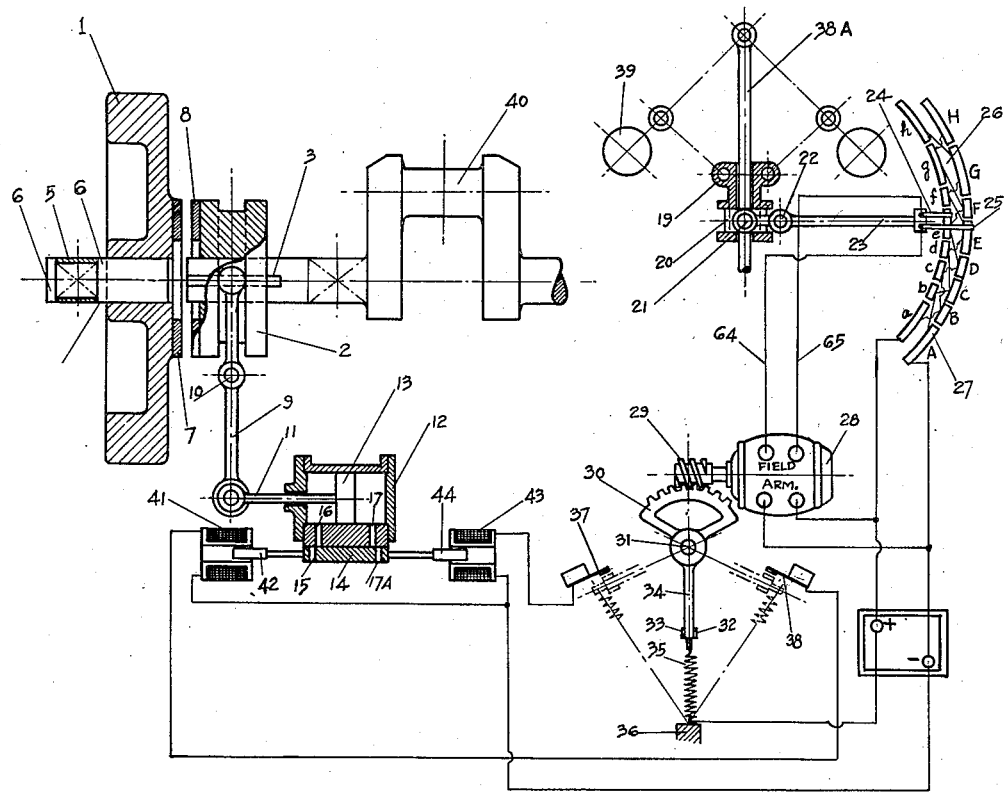
FIGURE No. 7
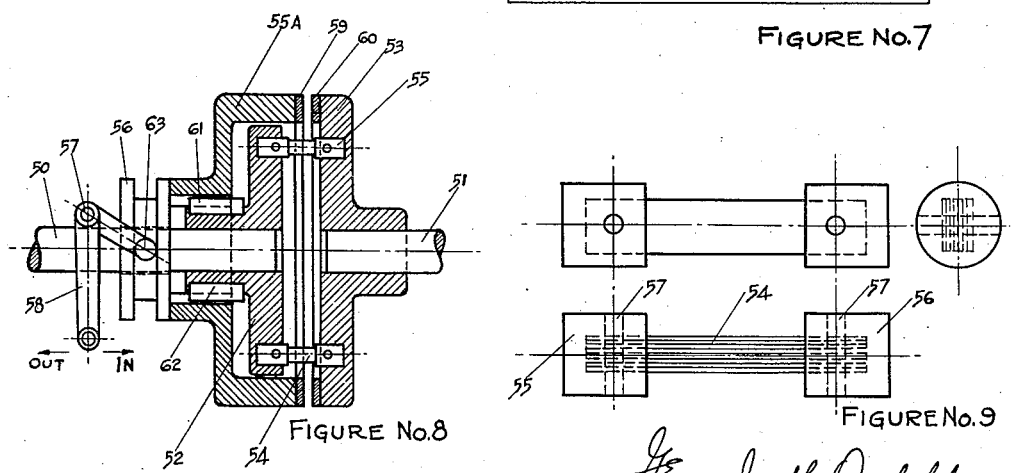
FIGURE No. 8
FIGURE No. 9
WITNESSES:
Frederic P. Porter.
John Dittmeier.
George Joseph Dashefsky
INVENTOR Patented July 18, 1933

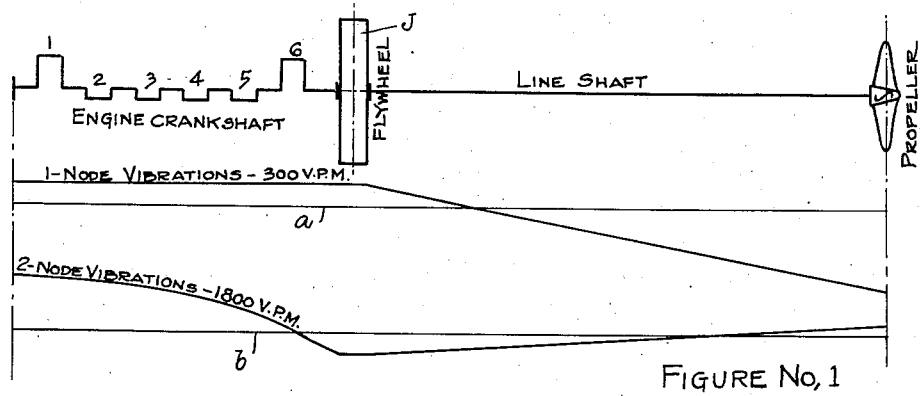
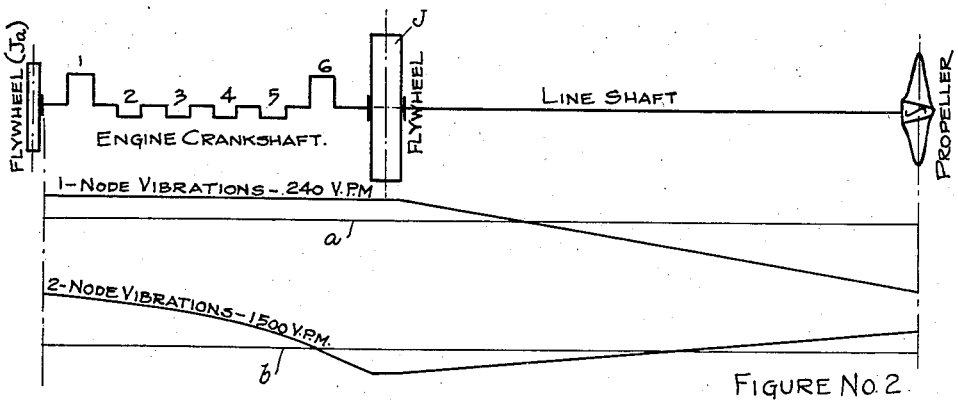
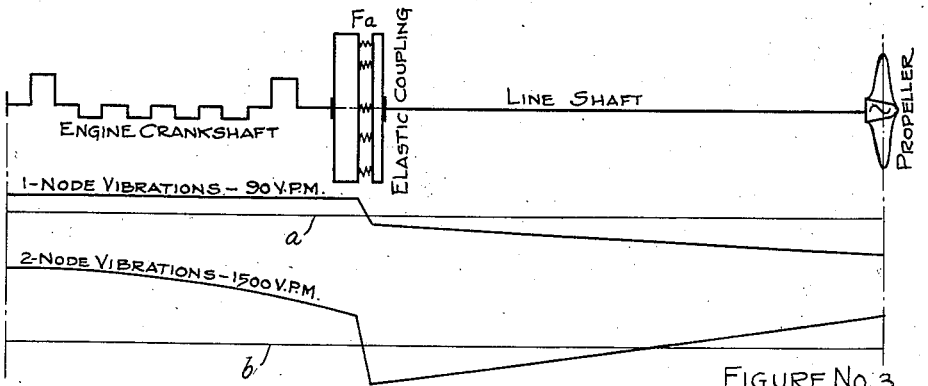

1,918,249

UNITED STATES PATENT OFFICE

GEORGE JOSEPH DASHEFSKY, OF BROOKLYN, NEW YORK

DEVICE FOR ELIMINATING TORSIONAL VIBRATION

Application filed November 22, 1927. Serial No. 235,034.

(GRANTED UNDER THE ACT OF MARCH 3, 1883, AS AMENDED APRIL 30, 1928; 370 O. G. 757)

This invention has for an object to provide a device which will effectively eliminate dangerous synchronous torsional vibration from the speed range of a power installation.

A further object is to provide a device which does not rely on limiting the magnitude of the vibrations by damping, but one which will so function as to eliminate possible synchronism between the disturbing torques and the natural frequency of the system.

In the drawings Figure 1 graphically shows, for instance, a marine propulsion plant of the six cylinder four cycle Diesel oil engine type associated with its characteristic torsional vibration amplitude and velocity curves respectively for its one and two noded vibrations, for example, in which lines $a$ and $b$ denote the center line or neutral axis of the shaft system indicated at the upper portion of this figure;

Figure 2 is a view similar to Figure 1, with the addition of, for instance, a fly-wheel $Ja$ and associated therewith are its like characteristic curves, which, compared with their corresponding curves in Figure 1 indicate typically the betterments afforded by said addition;

Figure 3 is a view similar to Figure 1, but substituting for its flywheel $Ja$ variable coupling $Fa$ for controlling the elasticity or flexibility of the plant, and associated therewith are its like characteristic curves, which, compared with their corresponding curves in Figure 1, indicate typically the betterments afforded by said substitution;

Figures 4 and 5 diagrammatically indicate the resonance curves characteristic respectively of Figures 1 and 2, with a portion of the possible speed ranges being indicated along the base of each figure relative to the oscillation amplitudes indicated along the left of each figure;

Figure 6 indicates graphically, relative to Figures 4 and 5 and the vertical speed range lines extending over these three figures, the typical substantial betterments affordable by varying or controlling the characteristics and/or relative elasticity of the transmissions of Figures 4 and 5 such that at transmission speeds at and between such vertical lines where the resonance curves of Figure 4 (for instance at speeds between 190 and 225, 280 and 325, 370 and 430, and above 550) are of wider amplitudes, the torque transmissions at such speeds, should be in substantial accordance with that typified in Figure 5, while (for instance at speeds below 190, between 225 and 280, 325 and 370, 430 and 550) the resonance curves of Figure 5 are of wider amplitudes than in Figure 4 and at such speeds the torque transmitted should be in substantial accordance with that typified in Figure 4. The bottom line of Figure 6 indicates the speed range typified in Figure 6 relative to the transmission characteristics of Figures 4 and 5. In said line "in" indicates the speed allocations at which torque in Figure 6 is transmitted of the characteristics of Figure 5 while "out" indicates the speed allocations at which torque in Figure 6 is transmitted of the characteristics of Figure 4. For instance by such allocation of speed ranges to the respectively different relative elasticities of the torque transmitted the typical curves of Figures 4 and 5 are limited to the relative minor and inconsequential magnitudes typified in Figure 6.

Figure 7 diagrammatically illustrates means for automatically controlling characteristics (for instance of the type indicated in Figure 2) of the transmission appropriate to its speed allocations for accomplishing the betterments of Figure 6 over the results typified in Figures 4 and 5 under their respective indicated speed conditions.

Figure 8 is a substantially central vertical sectional view of means for controlling characteristics (for instance relative elasticities) of the transmission, whose lever 58 is adapted to be operated substantially as lever 9 of Figure 7 is operated; and Figure 9 indicates respectively a side, plan and end view of one of the flexible units 54 adapted to connect the members 52 and 53 of Figure 8.

The use of multi-cylinder reciprocating engines, more particularly internal combustion engines, has resulted in experiencing synchronous torsional vibration, of the system comprising the masses of the engine, the flywheel and the driven piece of machinery. The driven machinery may be in the nature of a pump, electric generator, a marine line shaft and propeller, etc.

Every mass-elastic system similar to those mentioned above effectively constitutes a torsional pendulum having definite natural frequencies. The system may vibrate in one or more nodes. For each number of nodes there is a definite corresponding natural frequency.

The turning effort of a reciprocating engine is quite irregular. The torque variation over a cycle, particularly in internal combustion engines, may be very considerable. This irregular turning effort may be considered made up of a constant mean torque, and a number of harmonic torques whose frequencies are integral multiples of the frequency of the engine cycle. Each of the harmonic torques is striving to stimulate a vibration of the shafting.

When one of the harmonic torques has a frequency which is coincident with a natural frequency of the shaft system, a large vibration, often destructive to the shafting, may occur. The particular speed at which synchronism occurs is known as a critical speed. Above and below the critical speed the vibration is smaller. The curve expressing this phenomenon is known as the resonance curve.

Each critical speed is identified by the number of vibrations occurring in one revolution of the engine and the number of nodes in which the shafting is vibrating. Thus a 4½ order—2 noded vibration, means a critical speed resulting in a vibration which recurs 4½ times per revolution of the engine, and that the shaft is vibrating in two nodes.

The curve showing the relative amplitude of vibration over the shaft, at any instant, is known as the relative amplitudes or normal elastic curve.

It is characteristic of each type of engine to stimulate certain orders of vibration more strongly than others. This is due to the manner in which the cylinders co-act to build up or neutralize the vibrations set up by each.

In an installation with a 6 cylinder—4 cycle engine, for example, there is usually found present in the operating range, a 9th order, 6th order, and 4½ order vibration. If the engine is high enough in speed the 3rd order may also be detected. For a 6 cylinder—2 cycle engine there would usually be found 6th order and 9th order vibrations. Similarly, engines with more or less cylinders will be prone to other orders of vibration.

Reference is made to Figure 1, showing a marine propulsion plant, with a 6 cylinder—4 cycle engine of the Diesel-oil type. The relative amplitudes curves for the 1 and 2-noded modes of vibration are also shown. The shaft line-up has a 1-noded frequency of 300 vibrations per minute and the 2-noded vibration a frequency of 1800 vibrations per minute. The resonance curves corresponding to this line-up are given in Figure 4. This figure shows that there is a definite amplitude of vibration at each speed of the engine.

There are several ranges of speed where the vibrations would prove very troublesome or might result in fatiguing of the shaft metal, and ultimately cause its failure. In order to operate such an installation it is often necessary to avoid the dangerous range of these critical speeds. The flexibility of the unit is thus very much restricted.

The same trouble is constantly encountered in units, such as Diesel engined locomotives or ships, Diesel electric plants, gasolene engined propulsion plants for vehicles, etc. Steam engines, too, are prone to the same troubles from synchronous torsional vibration.

The addition of a rotating mass at a loop of the normal elastic-curve is effective in lowering the natural frequency of the vibration system. Introduction of elasticity at or near the nodes also results in lowering the natural frequency of the system.

Figure 2 is the same installation as shown in Figure 1, with a flywheel, $J_a$, secured to the free end of the crankshaft. The mass moment of inertia of the flywheel has been so chosen that the 2-noded frequency is lowered to 1500 V. P. M. The 1-noded frequency drops to 240 vibrations per minute. Figure 3 shows the same installation as indicated in Figure 1, with the exception that the flywheel of Figure 1 has been replaced by a combined flywheel and elastic coupling, $Fa$. This elastic coupling has been so chosen that the additional flexibility introduced in the line-up lowers the natural frequency for 2-noded vibrations, from 1800 vibrations per minute to 1500 vibrations per minute. The 1-noded frequency drops to 90 vibrations per minute.

Figure 4 shows the resonance curves for the original installation of Figure 1. Figure 5 shows the resonance curves applying to the installation of Figure 2, where an additional flywheel was added to the free end.

The vertical lines running up through Figures 4 and 5, divide the speed range of the engine into a series of bands. Where, in one unit there is severe vibration over a certain band of speeds, the same band in the other unit is quite free of vibration.

If the flywheel, $J_a$, at the foward end of the engine were so arranged that it could be connected or disconnected at will, every speed of the engine could be kept quite free of vibration.

Consider the flywheel to be mounted on a separate shaft co-axial with crankshaft and supported freely in a set of bearings. Consider also that the flywheel may be readily connected to or disconnected from the crank shaft through the medium of a clutch of some kind.

When the engine operator desires to operate at speeds up to about 190, he keeps the clutch thrown out. The flywheel is free of the installation which now is as shown in Figure 1, and whose vibration characteristics are given in Figure 4. The 1-noded vibrations of 6th and 3rd orders are negligible. Up to 190 we are thus free of any dangerous vibrations. To operate in the band from 190 to 225 R. P. M. the clutch is thrown in and the flywheel is consequently made a part of the vibration system. The resonance curves, Figure 5, now apply. The vibration over this range of speeds is quite small. If the flywheel had not been engaged, the curves of Figure 4 would have applied and considerable vibration would be encountered. To operate in the band 225 to 280 the clutch is thrown out again and the characteristics of the line-up are as shown in Figure 4.

Thus by keeping the flywheel engaged or disengaged with proper regard to the particular band of speeds in which operation is desired, freedom from severe vibration may be had over the whole speed range of the engine.

The vibration which will be encountered over the speed range utilizing my invention, is shown in Figure 6.

Refer again to Figure 3. The elastic coupling in this installation serves the same function as the flywheel in the installation of Figure 2, viz. to lower the shaft frequency of the system. By arranging a clutch capable of rigidly or more rigidly than otherwise connecting the driving and driven members of the coupling the same effects can be had as with the flywheel and clutch as discussed above. When the clutch is thrown in, the coupling becomes rigid. The installation is now similar to that of Figure 1. With the clutch out, the system is more elastic and the frequency is lowered. If the resonance curves of Figure 5 be considered to apply to the condition, where the clutch is out, the operation over the scale of speeds is identical with that described for the condition where the flywheel mass was employed to lower the frequency.

The flexibility introduced into the shaft system need not necessarily be in the form of a conventional elastic coupling. A length of relatively light shafting may be employed in its stead. To obtain the rigid connection it will be necessary to use a practically rigid or a more rigid, sleeve running between the points over which the flexible shaft extends, the transmission of torque being either by way of the shaft alone or by way of the shaft plus the sleeve. The sleeve will be so arranged that by engaging the clutch the shaft torques will be by-passed through the sleeve and shaft rather than only through the shaft which is the more flexible connection.

Thus far only manual means for connecting and disconnecting the clutches have been considered. It is desirable for some purposes to make the arrangement automatic. That is, to provide a mechanism for automatically throwing the clutch in or out according to the particular band of speeds in which the engine is being operated.

There are many arrangements which would accomplish the above. One arrangement is shown in Figure 7.

The scheme consists essentially in providing a form of tachometer, which instead of indicating speeds controls a switching arrangement. The switch closes the proper circuit for each speed and eventually controls the valves of a pneumatic or hydraulic cylinder which in turn engages or disengages the clutch.

The tachometer or governor 38A is driven from the engine. For each engine speed the sleeve 19 assumes a definite position. The lever 23, carries 2 metal contactors 24 and 25 which are insulated from each other. The lever 23 is pivoted on a fixed pin 22 and is conventionally actuated by the governor sleeve 19. The metal contactors 24 and 25 pass over the separated metal contact strips $a$ to $h$, and A to H arcuately disposed concentric with pin 22 with the contact of brushes 24 and 25 respectively contacting with said strips $a$ to $h$ and A to H. The contact strips are so arranged that the contactors 24 and 25 pass from one pair of strips to the next when the engine speed changes from one band of speeds to the next. Thus contact on $a$—A corresponds to the speed range 0 to 190 R. P. M., $b$—B to the speed band 190 to 225 R. P. M., $c$—C from 225 to 280 R. P. M. (See Figures 4, 5 and 6). By making proper connections the polarity of successive strips alternate, thus: $a$ is +, $b$ is —, $c$ is +, $d$ is —, etc., and A is —, B is +, C is —, D is +. As the brushes 24 and 25 sweep from sector to sector corresponding to a change in speed band of the engine, the polarity of wires 64 and 65 changes. These wires supply the fields of the motor and since the armature current is not reversed, the direction of rotation of the motor changes with the appropriate changes of contact brushes 24 and 25.

Suppose now that the engine is somewhere in the speed band 370 to 430 R. P. M. The brushes will rest on Sectors $f$—F, which correspond to this speed band. Current flows to the field connections in such direction as to cause the contact lever 34 to move toward contact point 38. The motor is geared down, by worm 29 and the pitch-diameter and extent of its engaging on segment 30 secured to arm 34 so that 10 seconds are occupied in bringing contact member 33 on arm 34 from its normal position, shown in full lines in Figure 7, into contact with contact member 37. Upon the completion of said contact the last tooth of segment 30 has been moved beyond meshing engagement with worm 29, whose continued rotation maintains said contact against the tension of spring 35 secured to arm 34 and stationary element 36 of the framework, by the thrust of the outer face of the last tooth of segment 30 against the end of the worm 29, until the governor shifts the position of contact brushes 24 and 25 into contact. Contacts 33 and 37 complete the circuit of solenoid 43 which sucks in the armature 44 and carries the slide valve 14, for instance, to the right until holes 15 and 16 are in line. Air or fluid, under pressure from a conventional supply, is thus admitted to the cylinder 12 and the piston 13 is forced to the right carrying with it levers 9 and 11. The clutch is thus thrown into and maintained in engagement and drives the flywheel through the friction or otherwise interlocked surfaces 7 and 8. The installation operates at the various speed ranges either transmitting torque more or less rigidly (or under different characteristics) whose resonance curves are respectively indicated in Figures 4 and 5, according to which show little or the least vibration for such speeds. The arrangement is such that once the clutch is thrown in or out it remains so until lever 34 is carried to the opposite side from where it happens to be. About 10 seconds are occupied by the motor, to carry the lever 34 between its extremes of travel. Rapid fluctuation of speed from one speed band to another will not therefore result in many useless engagements and disengagements of the clutch. Such fluctuations in speed due to change in load are often encountered.

The automatic operation of the variable clutch mechanism shown in Figure 8 is accomplished by connecting the piston rod 11 (and its associated parts and control means illustrated graphically in Figure 7) to the lower end of bell-crank line 58 which is provided with a connecting-pin hole for said purpose.

The application of the device when transmitting torque through a more or less elastic medium to lower the frequency of the system is identical with what has just been described for the flywheel mass. It is only a matter of differently engaging the driving and driven members of the coupling so as to transmit torque in either of the more or less elastic ways and thus for the time eliminate the other way affording harmful characteristics.

Figure 8 depicts an arrangement of an elastic coupling suitable for application to the invention. The preferably axially aligned driving and driven shafts or members 50 and 51 respectively have rigidly secured thereto coupling member 52 and 53 which are connected together by and through the medium of a series of spring units 55 each formed preferably of a plurality of flat parallel springs whose opposite ends are fitted into preferably round end members 55 and 56 and secured thereto by rivets or other securing means 57. Said members 55 and 56 are snugly fitted into holes in the adjacent faces of coupling members 52 and 53. Sliding collar 56 fits loosely on the shaft and is moved axially thereon by the lever bell-crank 58, which is pivoted at 57. The collar 56 is suitably secured to coupling member 55A feathered, by a plurality of keys 61, 62, to and free to slide upon the hub of member 52. Members 52 and 53 are respectively provided with adjacent surfaces 59 and 60 adapted to be frictionally interlocked or out of engagement according to the position of member 55A. In the instance shown, member 52 is of lesser diameter than member 53 and conveniently occupies a cavity formed in the side of member 55A whose peripherical flange extends beyond member 52 and said surface and said surface 59 is located upon the outer edge of said flange. By a movement of the lever 58 the friction surface 59 is thrown hard in contact with the friction surface 60. The connection results in by-passing the torque and for all practical purposes the coupling is torsionally rigid.

Figure 9 is an enlarged view of one of the flexible elements which comprises two lugs 55 and 56, a series of laminations 54 and the retaining pins 57.

Broadly, the invention consists in providing a means for readily altering the natural frequency of the shaft system over certain belts of speed, in such manner, that the critical speeds are always remote from the operating speed.

I do not limit myself to the particular type of installation disclosed in this specification, nor to the particular means described here, to attain the objects of my invention. The masses and elasticities may be introduced at any advantageous point in the shaft system. Any convenient means for regulating the frequency-controlling masses and elasticities may be used.

The invention herein described may be manufactured and used by or for the Government of the United States for governmental purposes without the payment to me of any royalty thereon or therefor.

Having described my invention what I claim as new and desire to secure by Letters Patent is:

1. Means for limiting torsional oscillations in a revolving power transmitting mechanism comprising a clutch between a driving part and a driven part of said mechanism, said clutch having a two-way coupling engagement, one way of engagement being by spring means interposed between the driving and driven members of the clutch, the other way being by rigidly interlocking portions of said clutch members.

2. Means for limiting torsional oscillations in a revolving power transmitting mechanism comprising a clutch between a driving part and a driven part of said mechanism, said clutch having a two-way coupling engagement, one way of engagement being by spring means interposed between the driving and driven members of the clutch, the other way being by rigidly interlocked portions of said clutch members and electro-magnetic means for making and breaking said interlocked engagement.

3. Means for limiting torsional oscillations in a revolving power transmitting mechanism comprising a clutch between a driving part and a driven part of said mechanism, said clutch having a two-way coupling engagement, one way being by spring means interposed between the driving and driven members of the clutch, the other way being by rigidly interlocked portions of said clutch members, and means for shifting the coupling of said clutch from one way of engagement to the other without interruption of the power transmission.

4. Means for limiting torsional oscillations in a revolving power transmitting mechanism comprising a clutch between a driving part and a driven part of said mechanism, said clutch having a two-way coupling engagement, one way being by spring means interposed between the driving and driven members of the clutch, the other way being by rigidly interlocked portions of said clutch members, and a centrifugal governor connected to the revolving mechanism for shifting the coupling of said clutch from one way of engagement to the other without interruption of the power transmission.

5. Means for limiting torsional oscillations in a rotary power transmitting means including driving and driven members, springs connecting and adapted to transmit driving torque between said members, and a clutch means including one of said members for eliminating said springs from transmitting the driving torque.

6. Means for limiting torsional oscillations in a rotary power transmitting means including driving and driven members, one of said members being of larger diameter than the other, resilient torque transmitting means connecting said members and a clutch member adapted to extend over the smaller member and substantially rigidly drivingly connect with said larger coupling.

7. In means for limiting the torsional oscillations tending to occur in revolving power transmission mechanisms under different operating speeds, the combination of two revoluble members, one being adapted to be driven from the other at will in either direction, elastic means adapted to connect said members at definite points and transmitting torque from one member to the other, means for changing the torque transmission characteristics of said means without interruption of the power transmission, and means for actuating said last-named means for altering the vibration frequency of the transmission mechanism according to the operating speed and keeping remote from the operating speed the critical speeds and transmission torque characteristics at which dangerous vibrations occur.

8. Means for limiting torsional oscillations in a revolving power transmitting mechanism embodying a rotating shaft of two separate parts one driven from the other, driving means continuously connecting said shaft parts, separate driving means normally out of driving connection for drivingly connecting said shaft parts between points located in a different area circumferentially from the first named driving means, the first named driving means being more elastic than the separate driving means, and means for drivingly connecting said separate driving means for limiting to harmless degree harmful torsional oscillations tending to develop in said mechanism.

9. Means for limiting torsional oscillations in a revolving power transmitting mechanism comprising the combination of a driving and a driven element; means intermediate said elements and having a two-way selective torque transmission, one way being a substantially elastic constant transmission, the other way being substantially less elastic than said one way and normally not transmitting torque; and means for causing torque to be transmitted between said elements by said other way for harmlessly limiting harmful torsional oscillations tending to develop during, and without interruption of, the transmission.

10. Means for limiting torsional oscillations in revolving power transmitting mechanism comprising the combination of a driving part and a driven part of said mechanism; an intermittent and a constantly connected driving connection, one of said driving connections being more flexible than the two connections when simultaneously connecting said driving and driven parts; and means for automatically moving an element of said intermittent driving connection into and out of driving engagement with another element thereof for transmitting torque therebetween only to harmlessly limit harmful torsional oscillations tending to develop during, and without interruption of, the transmission.

11. Means for limiting torsional oscillations in a revolving power transmission mechanism comprising the combination of a driving and a driven part of said mechanism; a clutch member revoluble with each of said parts for intermittently transmitting torque from one of said parts to the other; flexible means constantly connecting both said parts; and means for engaging and disengaging said clutch members and transmitting torque between said parts less flexibly through said clutch members or more flexibly through said flexible means, without interruption of the power transmission, accordingly as the torsional oscillations of said mechanism may or may not be harmful.

12. Means for limiting torsional oscillations in a revolving power transmitting mechanism comprising the combination of a driving part and a driven part of said mechanism; a clutch having coacting driving and driven members revoluble with said driving and driven parts respectively; spring torque transmitting means intermediate said driving and driven parts and constantly connecting points revoluble with said respective parts; means for making and breaking the driving engagement between said clutch members; power means for actuating said last named means; and electro-magnetic means for controlling when said power means actuates said making and breaking means.

13. Means for limiting torsional oscillations in a revolving power transmitting mechanism comprising the combination of a driving and a driven part of said mechanism; a clutch having driving and driven members respectively driven by said driving and driven parts and each of said members having juxtaposed surfaces; resilient means connecting and revoluble with said driving and driven members intermediate said clutch members; means including electro-magnetic mechanism for making and breaking the driving engagement between the juxtaposed surfaces of said clutch members; a centrifugal governor driven by said revolving mechanism; a switch-controlled electric circuit connected to said electro-magnetic mechanism; and means operated by said governor for moving said switch and causing said electro-magnetic means to engage or disengage said clutch and said parts to be driven by said clutch or said resilient means in accordance with predetermined speeds of rotation of said transmitting mechanism.

GEORGE JOSEPH DASHEFSKY.